(12) United States Patent
Yamada et al.

(10) Patent No.: US 11,192,345 B2
(45) Date of Patent: Dec. 7, 2021

(54) LAMINATE AND AIRBAG

(71) Applicants: Nitto Denko Corporation, Osaka (JP); Nitto Switzerland AG, Schmitten (CH)

(72) Inventors: Yosuke Yamada, Osaka (JP); Toru Tagami, Osaka (JP); Michael Ludwig, Raubling (DE)

(73) Assignees: Nitto Denko Corporation, Osaka (JP); Nitto Switzerland AG, Schmitten (CH)

( * ) Notice: Subject to any disclaimer, the term of this patent is extended or adjusted under 35 U.S.C. 154(b) by 0 days.

(21) Appl. No.: 16/620,692

(22) PCT Filed: Jun. 15, 2018

(86) PCT No.: PCT/JP2018/022996
§ 371 (c)(1),
(2) Date: Dec. 9, 2019

(87) PCT Pub. No.: WO2018/230724
PCT Pub. Date: Dec. 20, 2018

(65) Prior Publication Data
US 2020/0122441 A1    Apr. 23, 2020

(30) Foreign Application Priority Data
Jun. 16, 2017 (JP) .............................. JP2017-119102

(51) Int. Cl.
*B32B 27/12* (2006.01)
*B32B 27/36* (2006.01)
(Continued)

(52) U.S. Cl.
CPC ............... *B32B 27/12* (2013.01); *B32B 5/24* (2013.01); *B32B 27/36* (2013.01); *B60R 21/235* (2013.01);
(Continued)

(58) Field of Classification Search
CPC ...... B32B 2274/00; B60R 2021/23514; B60R 2021/23571; B60R 2021/2358;
(Continued)

(56) References Cited

U.S. PATENT DOCUMENTS 3,932,326 A    1/1976  Hoh et al.
4,130,603 A *  12/1978  Tanaka ................. C08G 63/672
                                                                  428/195.1
(Continued)

FOREIGN PATENT DOCUMENTS

CN    203168122 U    9/2013
EP    1466724         10/2004
(Continued)

OTHER PUBLICATIONS

PlasticsNet.com Arnitel(R); copolyester elastomers website published online by PlasticsNet at https://www.plasticsnet.com/doc/arnitelr-copolyester-elastomers-0001 (Year: 2020).*
(Continued)

*Primary Examiner* — Lee E Sanderson
(74) *Attorney, Agent, or Firm* — IPUSA, PLLC (57) ABSTRACT

A laminate includes a fabric; and a thermoplastic film, wherein the thermoplastic film is a multilayer film including an adhesive layer including a thermoplastic polyester elastomer and a barrier layer that is bonded to the adhesive layer, and that has a melting point that is higher than a melting point of the adhesive layer, and that includes a polymer, and wherein the fabric includes a polyester, and the fabric has a fabric weight of 190 g/m² or less.

5 Claims, 2 Drawing Sheets

(51) Int. Cl.
  *B32B 27/24* (2006.01)
  *B60R 21/235* (2006.01)
  *B32B 5/24* (2006.01)
(52) U.S. Cl.
  CPC . *B32B 2605/00* (2013.01); *B60R 2021/23509* (2013.01); *B60R 2021/23523* (2013.01)
(58) Field of Classification Search
  CPC .......... B60R 2021/23509; B60R 21/23; B60R 21/235; B29L 2022/27; B29L 2022/027; C09J 167/02; C09J 167/025; C09J 167/03; C09J 167/04; C09J 167/05; C09J 167/06; C09J 167/07; C09J 167/08; A41D 31/00; A41D 31/02; C08L 67/025
  USPC .............................. 428/36.1, 36.2; 280/728.2
  See application file for complete search history.

(56) References Cited

U.S. PATENT DOCUMENTS

| | | | | |
|---|---|---|---|---|
| 5,403,123 | A * | 4/1995 | Walters | B32B 5/04 |
| | | | | 405/186 |
| 5,534,575 | A * | 7/1996 | Foster | C08G 69/40 |
| | | | | 524/270 |
| 5,614,302 | A | 3/1997 | Nance, Jr. | |
| 6,015,524 | A * | 1/2000 | Kuder | B32B 7/12 |
| | | | | 264/173.12 |
| 6,416,613 | B1 | 7/2002 | Patrick et al. | |
| 2002/0033589 | A1 | 3/2002 | Barnes | |
| 2002/0145276 | A1 | 10/2002 | Veiga | |
| 2004/0006182 | A1 | 1/2004 | Omori | |
| 2004/0071927 | A1 | 4/2004 | Murphy et al. | |
| 2006/0035549 | A1 | 2/2006 | Honna | |
| 2006/0160453 | A1 * | 7/2006 | Suh | A61B 46/40 |
| | | | | 442/389 |
| 2006/0252322 | A1 * | 11/2006 | DeBenedictis | B60R 21/235 |
| | | | | 442/59 |
| 2007/0065614 | A1 * | 3/2007 | Schulthess | B32B 5/026 |
| | | | | 428/36.1 |
| 2008/0169631 | A1 * | 7/2008 | Hill | B60R 21/235 |
| | | | | 280/743.1 |
| 2008/0306216 | A1 * | 12/2008 | Sommerfeld | B32B 27/08 |
| | | | | 525/190 |
| 2009/0023005 | A1 | 1/2009 | Snuverink Ook Lansink et al. | |
| 2009/0023841 | A1 | 1/2009 | Yamauchi | |
| 2009/0208720 | A1 * | 8/2009 | Miyamoto | C08L 67/02 |
| | | | | 428/220 |
| 2009/0224515 | A1 | 9/2009 | Breed et al. | |
| 2010/0255270 | A1 * | 10/2010 | Stuebiger | B32B 5/26 |
| | | | | 428/201 |
| 2013/0328293 | A1 | 12/2013 | Kuramoto | |
| 2014/0220369 | A1 * | 8/2014 | Ishikawa | G09F 3/04 |
| | | | | 428/483 |
| 2017/0072668 | A1 | 3/2017 | Ishikawa et al. | |
| 2018/0086300 | A1 | 3/2018 | Yamada et al. | |

FOREIGN PATENT DOCUMENTS

| | | |
|---|---|---|
| EP | 1529808 | 5/2005 |
| JP | S51-115541 | 10/1976 |
| JP | S54-052143 | 4/1979 |
| JP | S58-222847 | 12/1983 |
| JP | 02114035 A * | 4/1990 |
| JP | H02-114035 | 4/1990 |
| JP | H03-007337 | 1/1991 |
| JP | H03-294542 | 12/1991 |
| JP | H04-201649 | 7/1992 |
| JP | H05-338092 | 12/1993 |
| JP | H10-273002 | 10/1998 |
| JP | H11-170461 | 6/1999 |
| JP | 2002-265891 | 9/2002 |
| JP | 2003-526552 | 9/2003 |
| JP | 2005-111926 | 4/2005 |
| JP | 2007-296798 | 11/2007 |
| JP | 2007296798 A * | 11/2007 |
| JP | 2011-102365 | 5/2011 |
| JP | 2016-501945 | 1/2016 |
| KR | 10-2002-0082870 | 10/2002 |
| KR | 20140087848 A * | 7/2014 |
| WO | 2010/134494 | 11/2010 |
| WO | 2014/092700 | 6/2014 |
| WO | 2015/133314 | 9/2015 |
| WO | 2016/158287 | 10/2016 |

OTHER PUBLICATIONS

International Search Report dated Aug. 14, 2018 with respect to PCT/JP2018/022996.
Office Action dated Apr. 29, 2020 issued with respect to the corresponding Indian Patent Application No. 201917051460.
Extended European Search Report dated Jun. 5, 2020 issued with respect to the corresponding European Patent Application No. 18816514.6.
International Search Report dated Aug. 14, 2018 with respect to PCT/JP2018/022992.
Extended European Search Report dated Jun. 5, 2020 issued with respect to the related European Patent Application No. 18818240.6.
"Base for air bag for motor car—comprises fabric, primer layer and polyester elastomer layer, to give improved bonding, flexibility and strength", DERWENT, Jan. 14, 1991 (Jan. 14, 1991), XP002178603.
Extended European Search Report dated Jul. 3, 2020 issued with respect to the related European Patent Application No. 20157485.2.
Office Action dated Jul. 2, 2020 issued with respect to the related Indian Patent Application No. 201917051304.
Office Action dated Aug. 26, 2020 issued with respect to the related U.S. Appl. No. 16/788,377.
Office Action dated Apr. 29, 2020 issued with respect to the related U.S. Appl. No. 16/707,413.
Office Action dated Oct. 9, 2020 issued with respect to the related U.S. Appl. No. 16/707,413.
Wypych, George, handbook of Polymers 2nd ed., 2016, ChemTec Publishing (Year: 2016).
International Search Report dated Aug. 14, 2018 with respect to PCT/JP2018/022994.
Office Action dated Jun. 3, 2020 issued with respect to the related Indian Patent Application No. 201917051393.
Extended European Search Report dated Jun. 5, 2020 issued with respect to the related European Patent Application No. 18816593.0.
Office Action dated Apr. 13, 2020 issued with respect to the related U.S. Appl. No. 16/710,458.
Office Action dated Aug. 26, 2020 issued with respect to the related U.S. Appl. No. 16/710,458.
Shonaike, G.O. Advanced Polymeric Materials: Structure Property Relationships, CRC press, 2003 (Year: 2003).
Office Action dated Jan. 26, 2021 issued with respect to the related U.S. Appl. No. 16/788,377.
Office Action dated Jan. 25, 2021 issued with respect to the related Indian Patent Application No. 201917051304.
Office Action dated Mar. 12, 2021 issued with respect to the corresponding Korean Patent Application No. 10-2019-7036769.
Office Action dated Mar. 11, 2021 issued with respect to the corresponding Canadian patent application No. 3,067,202.
Office Action dated Mar. 15, 2021 issued with respect to the corresponding Canadian patent application No. 3,067,205.
Office Action dated Mar. 12, 2021 issued with respect to the corresponding Canadian patent application No. 3,067,204.
International Search Report dated Aug. 14, 2018 with respect to PCT/JP2018/022995.
Office Action dated May 27, 2020 issued with respect to the corresponding Indian Patent Application No. 201917051404.
Extended European Search Report dated Jun. 5, 2020 issued with respect to the corresponding European Patent Application No. 18817069.0.
Office Action dated Mar. 11, 2021 issued with respect to the corresponding Korean Patent Application No. 10-2019-7036767.

(56) References Cited

OTHER PUBLICATIONS

Li Guichun et al., "Air Bag and Air Cushion Hovercraft", National Defense Industry Press, first edition, Jan. 2011, p. 28.
Office Action dated Apr. 21, 2021 issued with respect to the corresponding Chinese patent application No. 201880039602.4.
Office Action dated Feb. 23, 2021 issued with respect to the related Korean Patent Application No. 10-2019-7036761.
Office Action dated Feb. 23, 2021 issued with respect to the related Korean Patent Application No. 10-2019-7036762.
Office Action dated Feb. 25, 2021 issued with respect to the corresponding Canadian Patent Application No. 3,067,198.
Office Action dated May 27, 2021 with respect to the corresponding Chinese Application No. 201880039594.3.
Office Action dated May 31, 2021 with respect to the related Chinese Application No. 201880039337.X.
Office Action dated Jun. 3, 2021 with respect to the related Chinese Application No. 201880039675.3.
Office Action dated Jun. 9, 2021 with respect to the related U.S. Appl. No. 16/788,377.
Office Action dated Feb. 8, 2021 issued with respect to the related U.S. Appl. No. 16/710,458.
Office Action dated May 12, 2021 issued with respect to the related European Patent Application No. 20157485.2.
Office Action dated Jul. 29, 2021 with respect to the corresponding Chinese Patent Application No. 202010195653.5.
Office Action dated Sep. 3, 2021 issued with respect to the related Chinese Patent Application No. 201880039602.4.
Xiuping Zhao, "Flexographic Printing Technology Edition 2", China Light Industry, Aug. 31, 2013, pp. 188 to 189.
Office Action dated Sep. 6, 2021 issued with respect to the corresponding Korean Patent Application No. 10-2019-7036767.
Office Action dated Oct. 6, 2021 issued with respect to the corresponding Canadian Patent Application No. 3,067,205.

\* cited by examiner

LAMINATE AND AIRBAG

TECHNICAL FIELD

The present invention relates to a laminate and an airbag.

BACKGROUND ART

Conventionally, polymeric films that are used upon being adhered to a fabric are known as materials used for vehicle airbags, outdoor products, packaging applications, and the like.

For example, Patent Document 1 discloses a laminate made by laminating a thermoplastic elastomer onto a fabric made of thermoplastic resin fibers.

Further, Patent Document 2 discloses that a thermoplastic elastomer is applied or laminated to a fabric surface via an adhesive after performing at least one type of process among a discharge process and an ultraviolet process, on the fabric surface.

CITATION LIST

Patent Literature

[PTL 1]
Japanese Unexamined Patent Application Publication No. H2-114035
[PTL 2]
Japanese Unexamined Patent Application Publication No. H5-338092

SUMMARY OF INVENTION

Technical Problem

However, in the inventions disclosed in Patent Documents 1 and 2, the resistance to delamination of the laminate under high temperature and/or high humidity conditions is not considered.

In view of the above points, a problem to be solved by an embodiment of the present invention is to provide a laminate that is highly resistant to delamination under high temperature and/or high humidity conditions.

Solution to Problem

In order to solve the above problem, an embodiment of the present invention is a laminate including a fabric; and a thermoplastic film, wherein the thermoplastic film is a multilayer film including an adhesive layer including a thermoplastic polyester elastomer and a barrier layer that is bonded to the adhesive layer, and that has a melting point that is higher than a melting point of the adhesive layer, and that includes a polymer, and wherein the fabric includes a polyester, and the fabric has a fabric weight of 190 g/m$^2$ or less.

Advantageous Effects of Invention

According to an embodiment of the present invention, a laminate that is highly resistant to delamination under high temperature and/or high humidity conditions can be provided.

DESCRIPTION OF EMBODIMENTS

A laminate according to an embodiment of the present invention includes a fabric and a thermoplastic film, the thermoplastic film being a multilayer film including an adhesive layer and a barrier layer bonded to the adhesive layer. The adhesive layer includes a thermoplastic polyester elastomer, and the barrier layer has a melting point that is higher than the melting point of the adhesive layer and includes a polymer. The fabric includes polyester, and has a fabric weight of 190 g/m$^2$ or less.

In manufacturing laminates, there is always demand to reduce the cost of products. Particularly in the field of vehicle airbags, as the fabric material, conventionally, a polyamide such as nylon has been used in many cases, but in recent years, a fabric made of polyester that is relatively inexpensive has been used. Therefore, there is a need for a film material that is highly adhesive to a fabric including polyester yarns. However, there have been cases where conventional films are not sufficiently adhesive to the polyester fabric. The laminate according to the present embodiment includes a fabric including polyester and a multilayer film, in which the fabric and the multilayer film having the above-described particular configuration are combined, and, therefore, the adhesion between the fabric and the multilayer film is excellent in room temperature and under high temperature and high humidity conditions.

(Thermoplastic Film)

Figure 1:
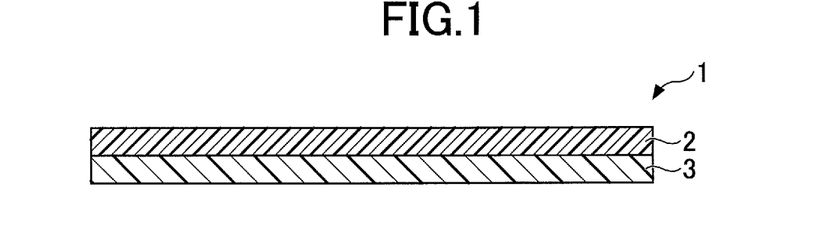
FIG. 1 is a schematic cross-sectional view of a multilayer film used in an embodiment of the present invention.

FIG. 1 illustrates a schematic cross-sectional view of a thermoplastic film 1 (multilayer film 1) used in a laminate of the present embodiment. As illustrated in FIG. 1, the thermoplastic film 1 is a multilayer film including a barrier layer 2 and an adhesive layer 3 bonded to the barrier layer 2. The adhesive layer 3 includes a thermoplastic polyester elastomer, the barrier layer 2 includes a polymer, and the melting point of the barrier layer 2 is higher than the melting point of the adhesive layer 3.

As used in the present specification, the barrier layer is a layer that functions to prevent the flow of gas in and out the layer. Further, the adhesive layer is a layer having adhesion to the fabric, and the adhesion may be exhibited by softening or melting the adhesive layer under a predetermined condition, for example, under a condition where the temperature and/or the pressure are increased. In the laminate, the adhesive layer is a layer directly laminated to the fabric and becomes an inner layer sandwiched between the fabric and the barrier layer in the laminate. Accordingly, the adhesive layer can be said to be a layer for bonding the barrier layer and the fabric.

The thermoplastic film (multilayer film) according to the present embodiment has a structure including at least two layers that are the barrier layer and the adhesive layer. This allows each layer to separately have an adhesive function when the film is adhered to the fabric and an airtight function in the laminate. Therefore, a high-quality laminate, having both adhesion to the fabric (resistance to delamination between the fabric and the thermoplastic film) and airtightness, can be reliably manufactured, as compared to a case where a monolayer film is adhered to the fabric.

The melting point of the barrier layer is higher than that of the adhesive layer. Therefore, by adhering the adhesive layer side of the multilayer film to the fabric while heating at a temperature lower than the melting point of the barrier layer, it is possible to soften or melt the adhesive layer to a softness suitable for adhering to the fabric, while preventing the softening of the barrier layer. This ensures that the adhesive function of the adhesive layer is exerted, and prevents the softening of the barrier layer to maintain the airtight function of the barrier layer. Accordingly, it is possible to both secure adhesion to the fabric and maintain the airtightness of the multilayer film.

The multilayer film can be satisfactorily adhered to the fabric by using heat, without using an adhesive or the like, thereby reducing the labor and cost of using an adhesive. Further, when the laminate is used for a long period of time or in a high-temperature, high-humidity environment, it is possible to prevent the laminate from losing flexibility and to prevent delamination, caused by alteration of the adhesive.

As used in the present specification, the melting point of a layer refers to the temperature at which the layer softens when the temperature of the layer is raised so that molecules of the polymer in the layer begin to move relative to each other and the polymer becomes fluid. Thus, the melting point of the adhesive layer and the barrier layer can be referred to as the melting point of the polymer (including the polymer alloy) in the adhesive layer and the barrier layer, respectively. The melting point of the polymer can be the melting peak temperature measured with a differential scanning calorimeter.

(Adhesive Layer)

The adhesive layer includes a thermoplastic elastomer, specifically a thermoplastic polyester elastomer. Preferably, the thermoplastic elastomer is a block copolymer including a hard segment (also referred to as a high melting point segment or a crystalline segment) and a soft segment (also referred to as a low melting point segment or an amorphous segment). The thermoplastic elastomer can exhibit fluidity when softened by heat, and can exhibit rubbery elasticity in the absence of heat.

In the present embodiment, by using a thermoplastic polyester elastomer for the adhesive layer, the resistance to delamination of the laminate can be improved. That is, the adhesion between the adhesive layer and the fabric and the adhesion between the adhesive layer and the barrier layer can be improved at room temperature and under high temperature and/or high humidity conditions. In particular, in the present embodiment, a multilayer film including such an adhesive layer is combined with a fabric including polyester, and, therefore, excellent adhesion can be exhibited. Further, it is possible to improve the flexibility and mechanical strength of the entire laminate.

The thermoplastic polyester elastomer may be of the polyester-polyether type including primarily aromatic polyester, etc., as a hard segment and primarily aliphatic polyether, etc., as a soft segment. Alternatively, the thermoplastic polyester elastomer may be of the polyester-polyester type including primarily aromatic polyester, etc., as a hard segment and primarily aliphatic polyester, etc., as a soft segment.

The hard segment of the thermoplastic polyester elastomer is preferably a segment including polyester formed by an aromatic polyester, for example, an aromatic dicarboxylic acid component and a diol component.

Examples of aromatic dicarboxylic acids forming the aromatic dicarboxylic acid component include terephthalic acid, isophthalic acid, phthalic acid, naphthalene-2,6-dicarboxylic acid, naphthalene-2,7-dicarboxylic acid, anthracene dicarboxylic acid, diphenyl-4,4'-dicarboxylic acid, diphenoxyethanedicarboxylic acid, 4,4'-diphenyl ether dicarboxylic acid, 5-sulfoisophthalic acid, and sodium 3-sulfoisophthalate. The aromatic dicarboxylic acid component may be included in the aromatic polyester, either alone or as a combination of two or more kinds. Also, in the hard segment, a portion of the aromatic dicarboxylic acid component may be replaced by an alicyclic or aliphatic carboxylic acid.

The diol forming the diol component may be a diol having a molecular weight of 400 or less, and examples include aliphatic diols such as 1,4-butanediol, ethylene glycol, trimethylene glycol, pentamethylene glycol, hexamethylene glycol, neopentyl glycol, decamethylene glycol and the like; alicyclic diols such as 1,1-cyclohexanedimethanol, 1,4-dicyclohexanedimethanol, tricyclodecanedimethanol and the like; and aromatic diols such as xylylene glycol, bis(p-hydroxy) diphenyl, bis(p-hydroxy)diphenylpropane, 2,2'-bis[4-(2-hydroxyethoxy)phenyl]propane, bis[4-(2-hydroxyethoxy)phenyl]sulfone, 1,1-bis[4-(2-hydroxyethoxy)phenyl]cyclohexane, 4,4'-dihydroxy-p-terphenyl, and 4,4'-dihydroxy-p-quarter-phenyl and the like. The diol component may be included in the aromatic polyester either alone or as a combination of two or more kinds.

The polyester included in the hard segment is preferably polybutylene terephthalate, polyethylene terephthalate, and polytrimethylene terephthalate, and more preferably polybutylene terephthalate, from the viewpoint of heat resistance and gas barrier properties.

The soft segment of the thermoplastic polyester elastomer preferably includes an aliphatic polyether and/or an aliphatic polyester. Examples of the aliphatic polyether include poly(ethylene oxide) glycol, poly(propylene oxide) glycol, poly(tetramethylene oxide) glycol (polytetramethylene ether glycol), poly(hexamethylene oxide) glycol, copolymer of ethylene oxide and propylene oxide, ethylene oxide addition polymer of poly(propylene oxide) glycol, copolymer glycol of ethylene oxide and tetrahydrofuran and the like. Further, examples of the aliphatic polyester include polys-caprolactone), polyenanthractone, polycaprolactone, polybutylene adipate, polyethylene adipate and the like.

Among these aliphatic polyethers and/or aliphatic polyesters, from the viewpoint of elasticity and formability, poly(tetramethylene oxide) glycol, ethylene oxide addition polymer of poly(propylene oxide) glycol, copolymer glycol of ethylene oxide and tetrahydrofuran, poly($\varepsilon$-caprolactone), polybutylene adipate, and polyethylene adipate are preferable, and among these, poly(tetramethylene oxide) glycol (polytetramethylene ether glycol), ethylene oxide addition polymer of poly(propylene oxide) glycol, and copolymer glycol of ethylene oxide and tetrahydrofuran are particularly preferable.

The number average molecular weight of the soft segment is preferably approximately 300 to 6000 in the copolymerized state.

The thermoplastic polyester elastomer described above may be modified with an unsaturated carboxylic acid, such as acrylic acid, maleic acid, fumaric acid, or derivatives thereof, in the presence of a radical generating agent. It is preferable that the unsaturated carboxylic acid or derivatives thereof added for modification be 0.1 parts by weight to 30 parts by weight with respect to 100 parts by weight of the thermoplastic polyester elastomer. The type and amount of component used for such modification may be selected as appropriate, depending on the material or application of the fabric to be adhered.

The content ratio of the hard segment in the thermoplastic polyester elastomer in the adhesive layer is preferably 10% by mass to 60% by mass and more preferably 20% by mass to 40% by mass with respect to 100% by mass of the thermoplastic polyester elastomer. By setting the content ratio to be 10% by weight or more, the mechanical strength, heat resistance, and durability in high temperature and high humidity of the multilayer film and the laminate can be improved. Further, by setting the content ratio to be 60% by mass or less, it is possible to ensure proper elasticity, flexibility, and formability of the multilayer film and the laminate.

The content ratio of the soft segment in the thermoplastic polyester elastomer in the adhesive layer is preferably 50% by mass to 90% by mass and more preferably 60% by mass to 80% by mass with respect to 100% by mass of the thermoplastic polyester elastomer. By setting the content ratio to be 50% by weight or more, it is possible to ensure proper elasticity, flexibility, and formability of the multilayer film and the laminate. Further, by setting the content ratio to be 90% by mass or less, the mechanical strength of the multilayer film and the laminate can be improved.

The content ratio of the soft segment in the thermoplastic polyester elastomer is related to the melting point and the softening point of the thermoplastic polyester elastomer. Generally, the higher the content ratio of the soft segment in the thermoplastic polyester elastomer, the lower the melting point and the softening point of the thermoplastic polyester elastomer. Therefore, by adjusting the content ratio of the soft segment in the thermoplastic polyester elastomer in the adhesive layer, the melting point of the thermoplastic polyester elastomer can be adjusted, and consequently, the melting point of the adhesive layer can be adjusted.

In the case of considering usage of the multilayer film at high temperature, the melting point of the thermoplastic polyester elastomer used in the adhesive layer is preferably 80° C. or higher, more preferably 100° C. or higher, and even more preferably 130° C. or higher. Further, the upper limit of the melting point of the thermoplastic polymer used for the adhesive layer is not particularly limited as long as the temperature of the melting point is below the melting point of the barrier layer; however, the upper limit of the melting point is preferably 250° C. or less, more preferably 200° C. or less, and even more preferably 170° C. or less.

The adhesive layer may include two or more kinds of the thermoplastic polyester elastomers described above. In addition to the thermoplastic polyester elastomer, one or more kinds of another thermoplastic elastomer that is not polyester-based, such as a polyamide elastomer, a polyolefin elastomer, a polyurethane elastomer, a polystyrene elastomer, a polybutadiene elastomer and the like, may also be included. Further, one or more kinds of non-elastomeric polymers, such as a polyester resin, a polyamide resin, a polyolefin resin, a polystyrene resin, an ethylene-vinyl acetate copolymer and the like may be included.

Commercial products of thermoplastic polyester elastomer include the respective series of "Hytrel (registered trademark)" manufactured by Toray DuPont Co., Ltd., "Primalloy (registered trademark)" manufactured by Mitsubishi Chemical Co., Ltd., "Perprene (registered trademark)" manufactured by Toyo Spinning Co., Ltd., and "Arnitel (registered trademark)" manufactured by Koninklijke DSM N.V., and the like.

Other components other than polymer may be added to the adhesive layer. Other components include additives such as pigments, fillers, antioxidants, hydrolytic stabilizers, anti-blocking agents and the like.

The overall thickness of the adhesive layer is preferably 5 µm to 50 µm, and more preferably 5 µm to 30 µm.

(Barrier Layer)

The barrier layer includes a polymer, preferably a thermoplastic polymer. Further, from the viewpoint of improving the elasticity and mechanical strength of the resulting laminate, it is preferable that the barrier layer includes a thermoplastic elastomer that is polyester-based, polyamide-based, polyolefin-based, polyurethane-based, polystyrene-based, or polybutadiene-based, and among these, it is preferable that the barrier layer includes a thermoplastic polyester elastomer. When the barrier layer includes a thermoplastic polyester elastomer, the thermoplastic polyester elastomer used in the barrier layer can be selected from the thermoplastic polyester elastomers described for the adhesive layer.

When a thermoplastic elastomer of the same type is used in the barrier layer and the adhesive layer, for example, when a thermoplastic polyester elastomer is used in both the barrier layer and the adhesive layer, the bonding between the barrier layer and the adhesive layer is strong, and the two layers are integrated, and, therefore, delamination in the multilayer film can be prevented in room temperature and under high temperature and/or high humidity conditions. Further, in the case of a laminate, the mechanical strength of the entire laminate can be improved. The interlayer bonding force between the barrier layer and the adhesive layer is improved at room temperature and also after long term storage and/or high temperature and high humidity storage.

Further, when thermoplastic polyester elastomer is used in the adhesive layer and the barrier layer, the type of hard segment in the thermoplastic polyester elastomer used in the barrier layer and the type of hard segment in the thermoplastic polyester elastomer used in the adhesive layer may be the same as or may be different from each other. Further, the type of soft segment in the thermoplastic polyester elastomer used in the barrier layer and the type of soft segment in the thermoplastic polyester elastomer used in the adhesive layer may be the same or may be different from each other. The type of the hard segment and the type of the soft segment in the thermoplastic polyester elastomer used in the barrier layer, and the type of the hard segment and the type of the soft segment in the thermoplastic polyester elastomer used in the adhesive layer, may be the same or may be different from each other. If the segments are the same in type, the bonding force between the barrier layer and the adhesive layer is increased, making delamination within the multilayer film less likely and further improving the mechanical strength of the multilayer film and the laminate.

The melting point of the polymer used in the barrier layer can be a temperature above the melting point of the adhesive layer. Accordingly, by heating the multilayer film at a temperature below the melting point of the barrier layer to adhere to the fabric, it is possible to prevent deformation or alteration of the barrier layer and the airtight function of the barrier layer can be maintained, even when the adhesive layer is softened or melted so as to have an adhesive function.

As described above, the melting point of the barrier layer is higher than the melting point of the adhesive layer; and the difference between the melting point of the barrier layer and the melting point of the adhesive layer is preferably 10° C. to 100° C., more preferably 20° C. to 80° C., and even more preferably exceeding 20° C. In the method according to the present embodiment, in order to adhere the multilayer film is adhered to the fabric by using heat, by setting the difference between the melting point of the barrier layer and the melting point of the adhesive layer to be greater than or equal to the predetermined temperature described above, the temperature can be easily controlled. Therefore, it is possible to reduce the generation of defective products in which the adhesive layer fails to perform the adhesive function because of insufficient softening, or the airtightness is impaired due to deformation or alteration of the barrier layer caused by softening of the barrier layer, and because defective products can be reduced, the production stability can be improved.

The melting point of the barrier layer is not particularly limited, but is preferably 100° C. or higher, more preferably 150° C. or higher, and even more preferably 180° C. or higher. Further, the upper limit of the melting point of the thermoplastic polymer used for the barrier layer is not particularly limited; but is preferably 300° C. or less, more preferably 270° C. or less, and even more preferably 230° C. or less, in consideration of the ease of handling when forming the multilayer film.

When the barrier layer includes a thermoplastic polyester elastomer, the content ratio of the hard segment in the thermoplastic polyester elastomer is preferably 40% by mass to 95% by mass and more preferably 60% by mass to 90% by mass with respect to 100% by mass of the thermoplastic polyester elastomer. By setting the content ratio to be 40% by mass or more, the mechanical strength, heat resistance, and durability in high temperature and high humidity of the multilayer film and the laminate can be improved. Further, by setting the content ratio to be 95% by mass or less, it is possible to ensure proper elasticity, flexibility, and formability of the multilayer film and the laminate.

Further, in the above case, the content ratio of the soft segment in the thermoplastic polyester elastomer in the barrier layer is preferably 5% by mass to 60% by mass and more preferably 10% by mass to less than 50% by mass with respect to 100% by mass of the thermoplastic polyester elastomer. By setting the content ratio to be 5% by mass or more, it is possible to ensure proper elasticity, flexibility, and formability of the multilayer film and the laminate. By setting the content ratio to be 60% by mass or less, the mechanical strength, heat resistance, and durability in high temperature and high humidity of the multilayer film and the laminate can be improved.

It is preferable that the ratio value (Psa/Pss) of the content ratio (Psa) of the soft segment in the thermoplastic polyester elastomer in the adhesive layer, with respect to the content ratio (Pss) of the soft segment in the thermoplastic polyester elastomer in the barrier layer, is 1.2 to 5, and more preferably 1.4 to 3.5. The above-described range allows the production stability to be improved, and a multilayer film and a laminate with excellent elasticity and flexibility, while having mechanical strength and heat resistance, can be obtained.

The barrier layer may include two or more kinds of the thermoplastic polyester elastomers described above. Further, similar to the adhesive layer, in the barrier layer, another thermoplastic elastomer that is not polyester-based may be compounded or a polymer that is not an elastomer may be compounded.

In the barrier layer, other components other than polymer may be added, similar to the adhesive layer. Other components include additives such as pigments, fillers, antioxidants, hydrolytic stabilizers, anti-blocking agents and the like.

The overall thickness of the barrier layer is preferably 5 µm to 50 µm. More preferably, the overall thickness is 5 µm to 30 µm.

(Layer Structure of Multilayer Film)

As described above, the thermoplastic film (the multilayer film) includes a barrier layer and an adhesive layer. The adhesive layer may be one layer or a plurality of layers. When there is more than one adhesive layer, the materials forming each adhesive layer may be the same or different. The melting points of the respective plural adhesive layers may also be the same or different. The barrier layer may also be a single layer or a plurality of layers. When there is more than one barrier layer, the materials and melting points of the respective plural barrier layers may be the same or different.

In a specific configuration, a multilayer film in which a first adhesive layer, a second adhesive layer, and a barrier layer are laminated in the stated order can be provided. In this case, a dye, such as a pigment, may be added to either the first adhesive layer or the second adhesive layer. By such a configuration, it is possible to reduce the amount of dye used, and the cost of manufacturing the laminate can be reduced.

Further, three adhesive layers may be provided, so as to form a multilayer film in which a first adhesive layer, a second adhesive layer, a third adhesive layer, and a barrier layer are laminated in the stated order. Further, two barrier layers may be provided, so as to form a multilayer film in which a first adhesive layer, a second adhesive layer, a first barrier layer, and a second barrier layer are laminated in the stated order.

(Manufacturing of Multilayer Film)

The multilayer films can be manufactured by bonding an adhesive layer and a barrier layer. In this case, the adhesive layer and the barrier layer may be molded by extrusion or the like as separate sheets or films in advance, and may be bonded together to form an integral layer. Examples of the manufacturing method include melt compression bonding by hot pressing or hot rolling on the superimposed sheets or films, extrusion lamination to extrude a molten material onto the molded sheets or films, and the like.

Further, the materials of each of the adhesive layer and the barrier layer can be melted and then extruded and molded simultaneously (coextruding) by using a blown extrusion method or a T-die method. Among these, it is preferable to use the blown extrusion method in which the area can be increased so that excellent productivity can be achieved.

(Fabric)

As used in the present specification, a fabric is a structure having a sheet-like shape obtained by laminating a multilayer film with a fabric, and functioning as a support to ensure the strength of the laminate that is the final product. Here, the sheet-like shape includes not only a flat shape but also a cylindrical shape, a bag-like shape, and a balloon-like shape.

The fabric preferably includes fibers, and may be a woven fabric, a knitted fabric, or a non-woven fabric, and may be fully or partially sewn. Among these, a woven fabric is preferable because the mechanical strength is high, and preferably has a two-axis structure in which a plurality of warp yarns and a plurality of weft yarns are combined, and may have a three-axis structure in which a plurality of warp yarns, a plurality of weft yarns, and a plurality of oblique yarns are combined. Among these, a fabric having the 2-axis structure is preferable, and more preferably is a plain-woven fabric in terms of strength and ease of manufacturing. Further, rather than being a planar fabric, the fabric may be woven into a bag without stitching OPW (One Piece Woven) so that the fabric can have a curved surface according to the shape of the intended product.

The OPW can be suitably used in applications such as airbags, which are inflated to store air inside and used. Among these applications, an OPW used for a curtain airbag has a complex curved surface with a plurality of chambers formed, and may have a structure forming irregularities when inflated. Typically, when a film is adhered to a fabric having such an irregular structure, delamination between the fabric and the film is more likely to occur than when the film is adhered to a fabric without irregularities. However, by using the multilayer film according to the present embodiment, even in the case of an OPW having irregularities, the multilayer film can be adhered satisfactorily so that delamination can be prevented.

Polymers constituting fibers preferably include homopolyesters of polyalkylene terephthalate, such as polyethylene terephthalate and polybutylene terephthalate; polyester fibers in which isophthalic acid, 5-sodium sulfoisophthalic acid, or aliphatic dicarboxylic acid, such as adipic acid, are copolymerized with an acid component constituting a repeating unit of polyester. By including a polyester in the fabric, the adhesion between the adhesive layer including the thermoplastic polyester elastomer and the fabric (resistance to delamination) can be improved at room temperature and under high temperature and/or high humidity conditions.

Further, in addition to the polyester fibers, the polymer may also include fibers other than polyester fibers, such as synthetic fibers, natural fibers, regenerated fibers, semi-synthetic fibers, inorganic fibers, and combinations thereof (including mix spinning or mix weaving). The fibers may also be composite fibers, such as core sheath fibers, side-by-side fibers, or split fibers.

Note that when the fabric is a woven fabric, the fabric may include two or more fibers, for example, for fibers used in yarns extending in different directions, different types of fibers may be used. More specifically, when the fabric has a two-axis structure including warp yarns and weft yarns, the warp yarns and weft yarns may be made of different types of fibers. In this case, at least one of the warp yarns and weft yarns may be a polyester fiber.

In the method according to the present embodiment, the fabric includes fibers including polyester, and the adhesive layer of the multilayer film includes a thermoplastic polyester elastomer, and, therefore, the adhesion between the fabric and the multilayer film is improved, and in the resulting laminate, peeling between the fabric and the multilayer film is unlikely to occur.

Preferably, the fabric is formed by using yarns having a total fineness (single yarn fineness×number of hybrid yarns) of 100 dtex to 700 dtex. Further, the single yarn fineness of the fibers used in the fabric is preferably 1 dtex to 10 dtex.

When the fabric is a plain-woven fabric, the weave density of the warp yarns and weft yarns is preferably 5 pcs/cm to 30 pcs/cm, respectively.

In consideration of the storage capacity and cost of the laminate (the final product), the fabric weight (weight per $m^2$) of the fabric may be 300 $g/m^2$ or less, more preferably 200 $g/m^2$ or less, even more preferably 190 $g/m^2$ or less, even more preferably 150 $g/m^2$ or less, and 100 $g/m^2$ or less. Further, from the viewpoint of ensuring mechanical strength, the fabric weight may be preferably 30 $g/m^2$ or more, more preferably 50 $g/m^2$ or more, and even more preferably 70 $g/m^2$ or more.

(Laminate)

Figure 2:
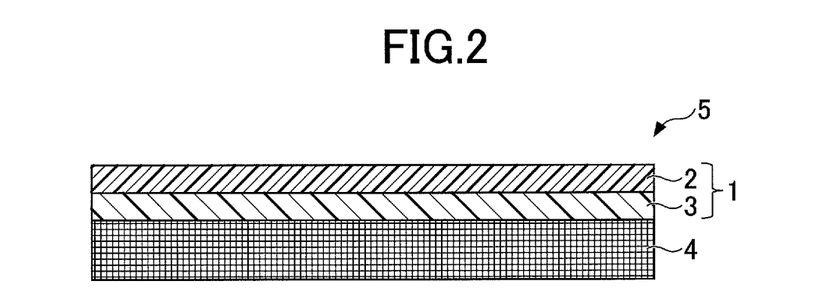
FIG. 2 is a schematic cross-sectional view of a laminate according to an embodiment of the present invention.

FIG. 2 illustrates a schematic cross-sectional view of a laminate according to an embodiment of the present invention. A laminate 5 is constituted by the multilayer film 1 including the barrier layer 2 and the adhesive layer 3 described above, and a fabric 4, adhered to each other.

Figure 3:
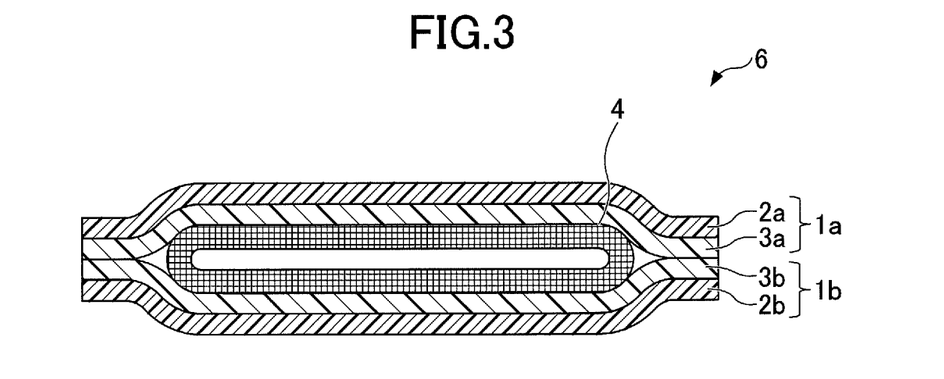
FIG. 3 is a schematic cross-sectional view of a laminate according to an embodiment of the present invention.

In the example of FIG. 2, the multilayer film 1 is disposed on one side of the fabric 4; however, the multilayer film according to the present embodiment may be provided on both sides of the fabric 4. When an OPW folded into a bag without stitching is used as the fabric, as illustrated in FIG. 3, a multilayer film 1a and a multilayer film 1b may be laminated on both sides of the OPW with the air of the bag removed and folded. The laminate illustrated in FIG. 3 may be used for an airbag or the like.

(Method of Manufacturing Laminate)

The laminate according to an embodiment of the present invention can be manufactured by superimposing the above-described multilayer film on the fabric so that the adhesive layer is in contact with the fabric, and then passing the superimposed multilayer film and fabric through a pair of pressurizing rollers, for example, while heating at a predetermined temperature.

Here, in the method of manufacturing a laminate according to the present embodiment, a "film" means a flexible thin film, regardless of the temperature and the hardness or the like thereof. That is, the supplied thermoplastic film may be at or below room temperature or at a temperature higher than room temperature. Further, the film may be softened so as to be at least partially capable of exerting an adhesive function. Thus, the laminate according to the present embodiment may be manufactured by adhering a thermoplastic film, which is supplied at or below room temperature, to the fabric while heating the thermoplastic film at a temperature below the melting point of the barrier layer by using a heating means, or may be manufactured by, for example, adhering a polymer, that is heated and extruded into a film by an extruder, to the fabric.

Figure 4:
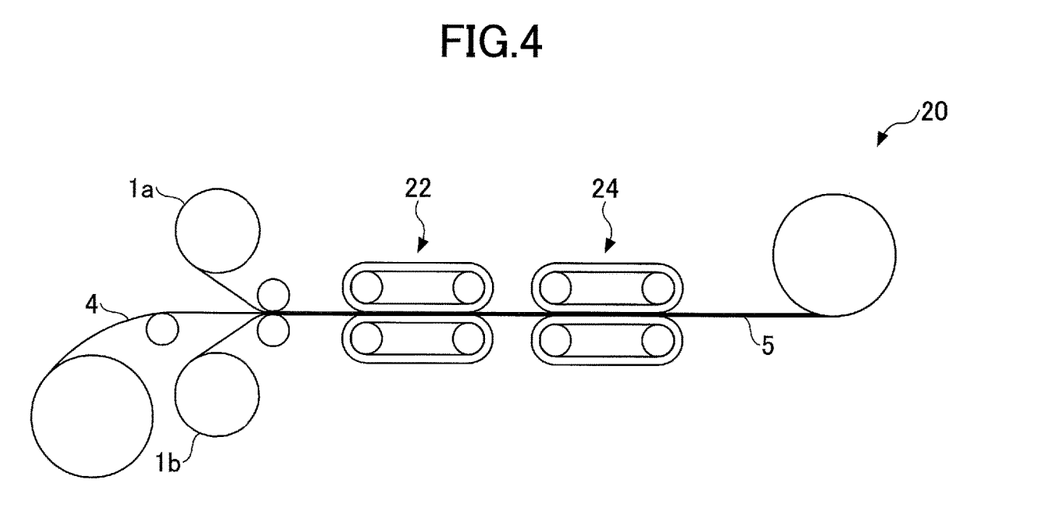
FIG. 4 is a schematic diagram of an apparatus for manufacturing a laminate according to an embodiment of the present invention.

FIG. 4 schematically illustrates a laminate manufacturing apparatus 20 for carrying out the method of manufacturing the laminate according to the present embodiment. FIG. 4 illustrates an apparatus for manufacturing a laminate in which multilayer films are laminated on both sides of the fabric 4. The laminate manufacturing apparatus 20 includes a heating unit 22 and a cooling unit 24.

In the manufacturing method using the laminate manufacturing apparatus 20 illustrated in FIG. 4, first, the fabric 4 and the multilayer films 1a and 1b that have been wound on reels or the like are unwound, respectively, and the multilayer films 1a and 1b are superimposed on both sides (the upper surface and the lower surface) of the fabric 4. Specifically, as illustrated in the figure, the multilayer film 1a, including a barrier layer 2a and an adhesive layer 3a, is superimposed so that the adhesive layer 3a is on the side of the fabric 4. Further, the multilayer film 1b, including a barrier layer 2b and an adhesive layer 3b, is superimposed so that the adhesive layer 3b is on the side of the fabric 4. Then, the superimposed multilayer film 1b, the fabric 4, and the multilayer film 1a are sent to the heating unit 22, and are pressed while being heated at the heating unit 22.

The heating unit 22 includes pressurizing means, for example, formed of a pair of opposing rollers (such as nip rollers) or a pair of opposing belts, such as the illustrated example. The superimposed multilayer film 1b, the fabric 4, and the multilayer film 1a are passed through a pair of pressurizing means as described above, so as to be heated and pressurized. Here, in the multilayer film, the melting point of the adhesive layer is a temperature that is below the melting point of the barrier layer, and, therefore, by setting the heating temperature in the heating unit 22 to be a temperature below the melting point of the barrier layer, it is possible to press the adhesive layer against the fabric in a state where the adhesive layer is sufficiently softened. This allows the multilayer films 1a and 1b to be adhered to both sides of the fabric 4, respectively, thereby forming the laminate 5 including the multilayer film 1b, the fabric 4, and the multilayer film 1a.

Subsequently, the laminate 5, that has been passed through the heating unit 22, is sent to the cooling unit 24. In the cooling unit 24, the temperature of the laminate 5 can be reduced to room temperature, preferably. The cooling unit 24 may include a cooling means including a cooling medium or a suction means. In the cooling unit 24, the laminate 5 may be pressurized by using a pressurizing means formed of a pair of opposing belts, as illustrated in the example; however, pressurization is not necessarily required.

In the manufacturing apparatus in FIG. 4, by omitting either one of the multilayer film 1a or the multilayer film 1b, it is possible to manufacture a laminate in which the multilayer film 1 is laminated on one side of the fabric 4 as illustrated in FIG. 2.

Further, the fabric 4 may be a tubular or bag-like OPW woven without stitching. This allows the laminate illustrated in FIG. 3 to be manufactured. In this case, air is removed from the inside of the bag-shaped fabric 4 so that the fabric 4 is in the form of a sheet, and the fabric 4 is wound on a reel or the like in advance, and is unwound before being superimposed. Then, the multilayer films 1a and 1b are superimposed on the upper and lower surfaces of the fabric 4, respectively, as described above. In this case, the fabric 4 is in the form of a bag, and, therefore, the upper surface and the lower surface of the fabric 4 both correspond to the surface of the fabric 4.

Figure 5:
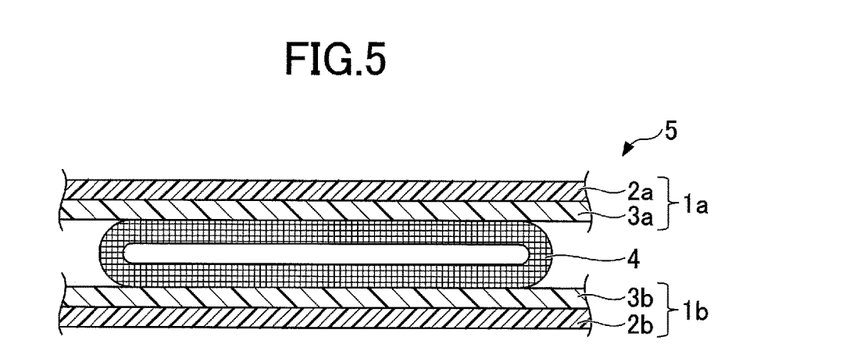
FIG. 5 is a schematic diagram illustrating a lamination of a fabric and a multilayer film in a manufacturing process of a laminate according to an embodiment of the present invention.

FIG. 5 schematically illustrates a state where the multilayer films 1a and 1b are respectively superimposed on the upper surface and lower surface of the fabric 4 that is loaded into the laminate manufacturing apparatus 20 in a flat state. As illustrated in FIG. 5, the superimposed multilayer film 1a, the fabric 4, and the multilayer film 1b are pressurized from both sides by a pair of pressurizing means at the heating unit 22. Thus, as illustrated in FIG. 3, the multilayer films 1a and 1b are bonded to the upper and lower surfaces of the fabric 4, respectively, and the edges of the multilayer films 1a and 1b are bonded to each other by heating or by an adhesive, thereby obtaining a laminate (airbag) 6. The excessive parts of the edges may be cut off. In this manner, an airbag may be manufactured in which the fabric is formed into the shape of a bag and a multilayer film is formed on at least one of the inner surface or the outer surface of the fabric.

The heating temperature when manufacturing the laminate is not particularly limited, as long as the temperature below the melting point of the barrier layer. The heating temperature may be a temperature below the melting point of the barrier layer and a temperature at which the adhesive layer softens. Specifically, the temperature is preferably 120° C. to 250° C. Further, the pressure of the pressurizing roller may be 5 N/cm$^2$ to 700 N/cm$^2$, preferably 10 N/cm$^2$ to 500 N/cm$^2$, depending on the composition of the multilayer film and the fabric. Further, the pressurizing pressure may be 5 N/cm$^2$ to 50 N/cm$^2$ depending on the operating conditions when manufacturing the laminate.

The laminate according to the present embodiment may be manufactured by a manufacturing method including a step of adhering the multilayer film at a temperature below the melting point of the barrier layer. Here, the "step of adhering the multilayer film at a temperature below the melting point of the barrier layer" may be a step of adhering the multilayer film to the fabric while the multilayer film maintains a state of being heated at a temperature below the melting point of the barrier layer.

Accordingly, a laminate (airbag) according to the present embodiment can be manufactured using, for example, a laminate manufacturing apparatus in which a multilayer film manufacturing apparatus is disposed in close contact with a fabric conveying apparatus. That is, in FIG. 4, at least one of the multilayer films 1a and 1b can be directly supplied from the multilayer film manufacturing apparatus (an extruder including a T-die or the like), instead of being supplied from a state of being wound on a reel. In this case, the multilayer material heated in the extruder and extruded into a film from the extruder, may be supplied at a temperature at least below the melting point of the barrier layer but higher than room temperature. Such a multilayer film is then disposed on the fabric, to adhere the multilayer film to the fabric, while applying pressure and/or heat or maintaining the temperature according to need.

Note that the laminate may be manufactured by using a laminate manufacturing apparatus, with a fabric manufacturing apparatus (such as a weaving machine) and the laminate manufacturing apparatus being disposed in close contact with each other. That is, the laminate can be manufactured by superimposing the multilayer film extruded from an extruder or the like on the fabric immediately after being woven, and applying pressure and/or heat or maintaining the temperature according to need.

In the above manner, an embodiment of the present invention may be the method of manufacturing the laminate including the step of adhering the side of the multilayer film with the adhesive layer to the fabric, at a temperature below the melting point of the barrier layer.

(Application)

The laminate manufactured by the method according to the present embodiment is suitable for use in vehicle airbags, outdoor products, packaging applications, and the like, and is particularly well suited for the manufacturing of vehicle airbags, particularly curtain airbags. A curtain airbag is mounted on the roof line at the top of the side window. When a high load is applied at the time of a collision, etc., the airbag is expanded into a shape of a curtain in a vertical downward direction along the side window.

The material of the curtain airbag is demanded to be pressure-resistant, because when the curtain airbag is expanded, the curtain airbag remains inflated for a few seconds, for example for 6 seconds to 7 seconds, after being activated. Further, before being expanded, a curtain airbag is often stored in a casing or the like in a folded or rolled up state for a long period of time, and is often exposed to high temperature and high humidity environments. Even for such applications, the multilayer film and the laminate according to the present embodiment can be suitably used.

Note that when a laminate including a film and a fabric is used as a vehicle airbag, various performances are required for the laminate in consideration of safety. Standards for safety have been established in each country, and the standards are becoming increasingly strict. For example, in the United States, the safety standards for airbags have been raised in recent years, and in terms of durability under high-temperature and high-humidity conditions, for example, the temperature and pressure conditions in high-temperature and high-humidity adhesion tests have conventionally been temperature: 40° C., relative humidity: 92%, and 168 hours, respectively, but these conditions have become more severe, to temperature: 70° C., relative humidity: 95%, and 408 hours, respectively. For this reason, there has been a need for an airbag material that can withstand such a severely high temperature and high humidity environment. In this regard, the laminate according to the present embodiment is resistant to delamination and exhibits excellent durability even after being stored under such severely high temperature and high humidity conditions.

PRACTICAL EXAMPLES

Although the present invention will be described in further detail in the following practical examples, the present invention is not limited to these practical examples.

In these practical examples, a multilayer film including a barrier layer and an adhesive layer was formed, and the multilayer film was adhered to a fabric to manufacture a laminate, and the manufactured laminate was evaluated.

[Raw Material for Multilayer Film]

The following materials were used as raw materials for the multilayer film. The melting point of each raw material is the melting peak temperature measured by a differential scanning calorimeter.

Thermoplastic polyester elastomer (TPEE-1): a polyester-polyether block copolymer with polybutylene terephthalate as the hard segment and polytetramethylene ether glycol with a number-average molecular weight of 2000 as the soft segment. In the above copolymer, the content ratio of the polybutylene terephthalate is 25% by weight and the content amount of the polytetramethylene ether glycol segment is 75% by weight (melting point 152° C.).

Thermoplastic polyester elastomer (TPEE-2): a polyester-polyether block copolymer with polybutylene terephthalate as the hard segment and polytetramethylene ether glycol with a number-average molecular weight of 2000 as the soft segment. In the above copolymer, the content ratio al the polybutylene terephthalate is 58% by weight and the content amount of the polytetramethylene ether glycol segment is 42% by weight (melting point 207° C.).

[Evaluation of Multilayer Film and Laminate]
<High-Temperature, High-Humidity Adhesion (Resistance to Delamination Under High-Temperature, High-Humidity Conditions)>

A test piece having a size of 50 mm×150 mm was fabricated from the laminate obtained by laminating the multilayer film on the fabric, and this test piece was placed in an airtight container and was maintained for 408 hours in the container in which the temperature was 70° C. and the relative humidity was 95%. While fixing the fabric portion of the test piece (laminate) taken out from the container, the force, which was required to pull the multilayer film portion (barrier layer and adhesive layer) in a direction of 180 degrees at the tensile rate of 100 mm/minute, was measured as the peel force (N/mm). The evaluation standard was as follows.

◯ (good): The peel force exceeded 0.5 N/mm.
Δ (ordinary): The peel force was 0.3 N/mm to 0.5 N/mm.
x (bad): The peel force was less than 0.3 N/mm, or delamination occurred in the multilayer film.

When measuring the peel force, in order to prevent the multilayer film from being broken or stretched during the peel test, a polyethylene terephthalate film with a thickness of 100 μm was bonded to the barrier layer side of the multilayer film via an adhesive, to reinforce the multilayer film.

Practical Example 1

(Multilayer Film)

The multilayer film was manufactured by using a blown extrusion device (manufactured by Dr. Collin GmbH) having three extruders. In the respective extruders, the thermoplastic polyester elastomer (TPEE-1), the thermoplastic polyester elastomer (TPEE-1), and the thermoplastic polyester elastomer (TPEE-2) were loaded, and were melted at a temperature greater than or equal to the melting point of each raw material, and a three-layer film was fabricated by the blown extrusion method.

The resulting film was a three-layer film in which a first adhesive layer formed of the thermoplastic polyester elastomer (TPEE-1), a second adhesive layer formed of the thermoplastic polyester elastomer (TPEE-1), and a barrier layer formed of the thermoplastic polyester elastomer (TPEE-2) were laminated in the stated order. The extrusion amount of the first adhesive layer, the second adhesive layer, and the harrier layer was 10 g/m², respectively.

(Lamination of Multilayer Film and Fabric)

As a fabric, a plain-woven fabric woven with polyethylene terephthalate fibers was used. The total fineness of warp yarn and weft yarn was 470 dtex, and the weave density was 22 pcs/cm for the warp yarn and 15 pcs/cm for the weft yarn. The fabric weight of the fabric was 180 g/m².

A laminating device (Twin-belt flat lamination system, manufactured by Maschinenfabrik Herbert Meyer GmbH) was used to laminate the above-described polyethylene terephthalate fabric and the above-described three-layer film so that the adhesive layer came into contact with the fabric surface, and the adhesive layer was softened while the laminated materials were heated at 200° C. and were pressurized with a nip roller to 18 N/cm², and the fabric and the three-layer film were laminated.

Practical Example 2

(Multilayer Film)

A three-layer film was fabricated in the same manner as practical example 1.

(Lamination of Multilayer Film and Fabric)

A laminate including a fabric and a multilayer film was fabricated in the same manner as in practical example 1, except that the fabric was changed. The fabric used in practical example 2 was a plain-woven fabric woven with polyethylene terephthalate fibers, and the total fineness of warp yarn and weft yarn was 470 dtex; however, the weave density was 15 pcs/cm for the warp yarn and 15 pcs/cm for the weft yarn, and the fabric weight of the fabric was 150 g/m². Evaluation was performed in the same manner as in practical example 1. The results are given in Table 1.

Practical Example 3

(Multilayer Film)

A three-layer film was fabricated in the same manner as practical example 1.

(Lamination of Multilayer Film and Fabric)

A laminate including a fabric and a multilayer film was fabricated in the same manner as in practical example 1, except that the fabric was changed. The fabric used in practical example 3 was a plain-woven fabric woven with polyethylene terephthalate fibers, and the total fineness of warp yarn and weft yarn was 470 dtex; however, the weave density was 10 pcs/cm for the warp yarn and 10 pcs/cm for the weft yarn, and the fabric weight of the fabric was 95 g/m². Evaluation was performed in the same manner as in practical example 1. The results are given in Table 1.

Comparative Example 1

(Multilayer Film)

A three-layer film was fabricated in the same manner as practical example 1.

(Lamination of Multilayer Film and Fabric)

A laminate including a fabric and a multilayer film was fabricated in the same manner as in practical example 1, except that the fabric was changed. The fabric used in comparative example 1 had a total fineness of warp yarn and weft yarn of 470 dtex; however, the fabric was a plain-woven fabric woven with nylon fibers, and the weave density was 22 pcs/cm for the warp yarn and 19 pcs/cm for the weft yarn, and the fabric weight of the fabric was 220 g/m². Evaluation was performed in the same manner as in practical example 1. The results are given in Table 1.

3, 3a, 3b adhesive layer
4 fabric
5 laminate
6 laminate (airbag)
20 laminate manufacturing apparatus
22 heating unit
24 cooling unit

The invention claimed is:

1. An airbag formed using a laminate, the laminate comprising:
   a fabric; and
   a thermoplastic film, wherein
      the thermoplastic film is a multilayer film including
         an adhesive layer including a thermoplastic polyester elastomer; and
         a barrier layer that includes a thermoplastic polyester elastomer, wherein the thermoplastic polyester elastomer included in the barrier layer has a melting point that is higher than a melting point of the adhesive layer, and the barrier layer being bonded to the adhesive layer,
      the adhesive layer is a plurality of layers,

TABLE 1

| | CONFIGURATION OF LAMINATE | | | | EVALUATION | |
| --- | --- | --- | --- | --- | --- | --- |
| | | FABRIC | | | ADHESION AT | |
| | ADHESIVE LAYER TYPE | MATERIAL | WEAVE DENSITY (WARP YARN (PCS/cm) × WEFT YARN (PCS/cm)) | FABRIC WEIGHT (g/m²) | HIGH TEMPERATURE AND HIGH HUMIDITY | LIGHTNESS |
| PRACTICAL EXAMPLE 1 | PTEE-1 | POLYETHYLENE TEREPHTHALATE | 22 × 15 | 180 | ○ | ○ |
| PRACTICAL EXAMPLE 2 | PTEE-1 | POLYETHYLENE TEREPHTHALATE | 15 × 15 | 150 | ○ | ○ |
| PRACTICAL EXAMPLE 3 | PTEE-1 | POLYETHYLENE TEREPHTHALATE | 10 × 10 | 95 | ○ | ○ |
| CMPARATIVE EXAMPLE 1 | PTEE-1 | NYLON | 22 × 19 | 220 | X | X |

As indicated in Table 1, all of the laminates of practical examples 1 to 3, which were made by laminating a base material made of a polyethylene terephthalate and a multilayer film having an adhesive layer including a thermoplastic polyester elastomer, had excellent adhesion under high temperature and high humidity. On the other hand, with respect to the laminate using a fabric made of nylon, the adhesion under high temperature and high humidity was inferior to those of practical examples 1 to 3. Further, it was also found that the multilayer film according to the present embodiment can be adhered to a fabric having a relatively low weave density as used in practical examples 1 to 3. Further, the laminates of practical examples 1 to 3 were lighter than that of comparative example 1.

The present patent application is based on and claims priority to Japanese Patent Application No. 2017-119102, filed on Jun. 16, 2017, the contents of which are incorporated herein by reference in their entirety.

REFERENCE SIGNS LIST 1, 1a, 1b thermoplastic film (multilayer film)
2, 2a, 2b barrier layer the thermoplastic polyester elastomer included in the adhesive and the barrier layers comprises soft segments and hard segments, wherein a content of soft segments in the thermoplastic polyester elastomer included in the barrier layer is 5 wt % to 60 wt % relative to the total weight of the thermoplastic polyester elastomer in the barrier layer,
the fabric includes a polyester, and
the fabric has a fabric weight of 190 g/m² or less, wherein
the fabric is formed to have a shape of a bag, and
the multilayer film is formed on a surface of the fabric.

2. The airbag according to claim 1, wherein the thermoplastic polyester elastomer included in the adhesive layer is a block copolymer including a soft segment including a polyether and a hard segment including a polyester.

3. The airbag according to claim 1, wherein the melting point of the barrier layer is higher than the melting point of the adhesive layer by more than 20° C.

4. The airbag according to claim 1, wherein the fabric has a warp yarn or a weft yarn having a weave density of from 5 pcs/cm to 15 pcs/cm.

5. The airbag according to claim 1, wherein the melting point of the barrier layer is greater than or equal to 180° C.

\* \* \* \* \*